United States Patent
Cluff et al.

(10) Patent No.: US 6,919,022 B2
(45) Date of Patent: Jul. 19, 2005

(54) PORTABLE DRINKING DEVICE WITH INTEGRAL $H_2O_2$ DISPENSER

(76) Inventors: Brent C. Cluff, 3513 W. Church St., Thatcher, AZ (US) 85552; Gary T. Payne, 8902 E. Pine Valley Dr., Tucson, AZ (US) 85710

( * ) Notice: Subject to any disclaimer, the term of this patent is extended or adjusted under 35 U.S.C. 154(b) by 117 days.

(21) Appl. No.: 10/350,274

(22) Filed: Jan. 23, 2003

(65) Prior Publication Data

US 2004/0144701 A1 Jul. 29, 2004

(Under 37 CFR 1.47)

(51) Int. Cl.$^7$ .................................................. C02F 1/72
(52) U.S. Cl. .................... 210/205; 210/244; 222/189.1; 220/87.1
(58) Field of Search ........................ 215/308, 387–389, 215/386, 400; 210/282, 198.1, 101, 244, 245, 205, 759; 422/28, 37; 424/616; 220/87.1; 222/189.1

(56) References Cited

U.S. PATENT DOCUMENTS 2,781,312 A * 2/1957 Klumb et al. ................. 210/94
5,632,904 A * 5/1997 Samad et al. ............... 210/764
2003/0136748 A1 * 7/2003 Braithwaite ................. 210/806

FOREIGN PATENT DOCUMENTS

DE         19851757 A1 *  5/2000  ............. C02F/1/72

* cited by examiner

Primary Examiner—Terry K. Cecil
(74) Attorney, Agent, or Firm—Dale F. Regelman

(57) ABSTRACT

A new and useful approach to cleaning raw water or other raw liquid is provided. A metered amount of stabilized hydrogen peroxide is added to the raw water or other liquid, to clean the raw water or other liquid. In one particularly useful embodiment of the present invention, a portable drinking device is designed so that a metered amount of stabilized hydrogen peroxide can be added to a portable container of liquid, to clean raw water or other liquid in the portable container. Thus, a hiker, military person, or other person who may have to depend on his/her environment for sustenance, and who may not have an available water source other than raw water, has a simple and efficient way of using virtually any available body of raw water as a source, and cleaning the raw water, to provide the person with a portable source of clean water.

3 Claims, 2 Drawing Sheets

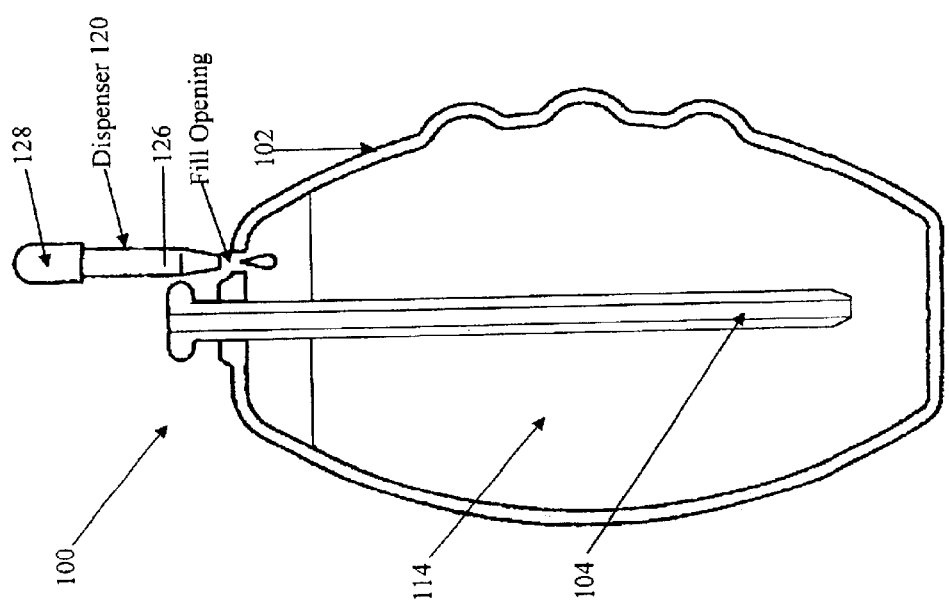

PORTABLE DRINKING DEVICE WITH INTEGRAL H₂0₂ DISPENSER

BACKGROUND

The present invention relates to a device and method designed to clean raw water or other liquid against contaminating organisms such as cryptosperidia and giardia, and to provide a source of the cleaned water or other liquid. The principles of the present invention are particularly useful in providing a portable container designed to enable a body of raw water or other liquid to be quickly and efficiently cleaned, and to provide a portable source of the cleaned water or other liquid.

The term "raw liquid or raw water", as used in this application, means water or other liquid which has not been subjected to municipal type of treatment, (e.g., river water, lake water, marsh water, ground water, reservoir water, secondary treatment waste water, industrial waste water and the like) or if subjected to municipal type of treatment has been subjected to possible organisms such as cryptosperidia and/or giardia or other contaminants.

Additionally, the concept of a liquid such as water being "cleaned" or "clean" means that the water or other liquid is in a condition that is suitable for human consumption.

In municipal water systems, treating raw water to clean the water to a level that, by general community safety standards, is suitable as potable, drinkable water typically requires several processing steps and significant processing equipment to carry out those processing steps. Such water systems may include e.g various types of processing steps in which (a) materials such as chlorine or sodium hypochlorite are added to raw water (b) a coagulant is added that is appropriate to coagulate suspended substances, (c) the coagulated substances are flocculated for sedimentation separation, and (d) the raw water is subjected to sand filtration, and other additional cleaning steps. As will be appreciated by those in the art, such processing involves a number of steps and considerable treatment equipment to bring the raw water to a cleaned state. Moreover, as is also know to those in the art, there are times when water that has been cleaned by a municipal process may still be subjected to contaminating organisms such as cryptosperidia and giardia and may still contain chlorine which make such water unsuitable to human consumption. Thus, suggestions for advanced treatment of water systems include biological treatment; treatment with ozone and treatment with activated carbon.

The applicants believe there is a need for a simple and efficient way of cleaning raw water or other liquid, that does not require the type of processing steps or equipment that are typically used in municipal water treatment systems.

The applicants also believe there is a need for a portable water container with a simple and efficient way of cleaning raw water, so that a hiker, military person, or other person who may have to depend on his/her environment for sustenance, and who may not have an available water source other than raw water, has a simple and efficient way of using virtually any available body of raw water as a source, and cleaning the raw water, to provide the person with a portable source of clean water.

SUMMARY OF THE PRESENT INVENTION

The present invention provides a new and useful approach to cleaning raw water or other raw liquid.

According to the present invention, raw water or other liquid is cleaned by adding to the raw water or other liquid a metered amount of stabilized hydrogen peroxide In addition, in one particularly useful embodiment of the present invention, a portable drinking device is designed so that a metered amount of stabilized hydrogen peroxide can be added to a portable container of liquid, to clean raw water or other liquid in the portable container. Thus, a hiker, military person, or other person who may have to depend on his/her environment for sustenance, and who may not have an available water source other than raw water, has a simple and efficient way of using virtually any available body of raw water as a source, and cleaning the raw water, to provide the person with a portable source of clean water.

The term "stabilized hydrogen peroxide", as used in this application, means hydrogen peroxide that has stabilizers added to it, that prevent the hydrogen peroxide from breaking down in water. Thus, when a metered amount of the stabilized hydrogen peroxide is added to raw water, the stabilized hydrogen peroxide will oxidize contaminating organisms and chlorine, to clean the water, but it will not break down in the water. In the applicants' experience, stabilized hydrogen peroxide has been used in hair products, but has never been used in a treatment process designed to be added to raw water to produce a source of cleaned, drinkable water.

In this application, reference to a "portable drinking device" means a portable bottle, bladder, canteen, or other drinking container that can be carried by a human or animal, or attached to an article (such as a belt, backpack, strapping system, shoulder sling or similar article) that is carried by a human or animal and which is designed to provide a safe source of transportable drinking water for a human or animal Further features of the present invention will be apparent from the following detailed description and the accompanying drawings.

BRIEF DESCRIPTION OF THE DRAWINGS

FIG. 3 is a cross sectional, schematic illustration of portions of another embodiment of a portable drinking device according to the present invention.

DETAILED DESCRIPTION

As described above, the present invention relates to a device and method for cleaning raw water or other liquid that is particularly useful in a portable drinking device. The principles of the present invention are described below in connection with a portable water container, but it will be clear to those in the art that the principles of the present invention can be used for cleaning raw water or other liquid in environments other than portable drinking devices.

Figure 1:
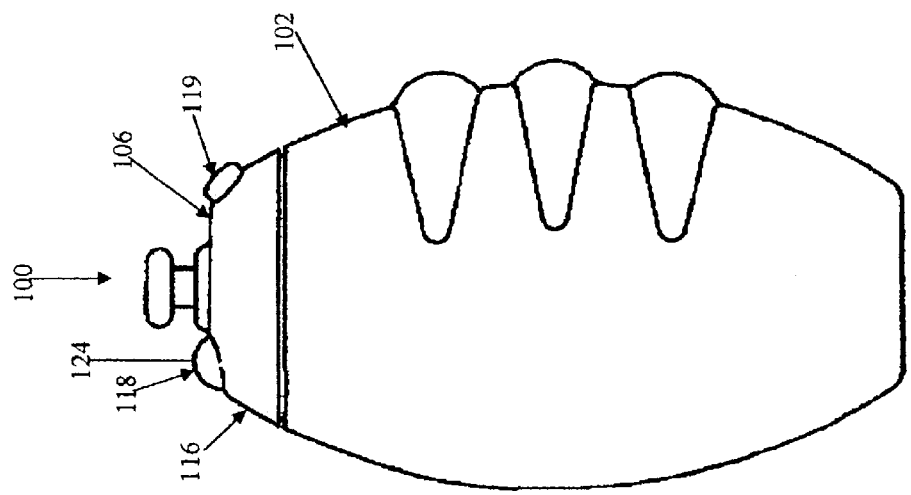
FIG. 1 is a side view of a portable drinking device according to the present invention.

As shown in the figures, a portable water bottle 100 includes a container 102 for water, and a drinking tube 104 or other delivery device for drawing water from the container. The drinking tube 104 extends through a cap 106 of the bottle, and is preferably maintained coupled to the cap, so that the cap and drinking tube can be removed and replaced in the bottle as a unit. The cap 106 can be attached to the container in various ways. For example, in the embodiments of FIGS. 1–2, the cap 106 has threads 108 that can engage mating threads 110 on the container 102, so that the cap 106 can be selectively attached to or separated from the container. The drinking tube 104 has a relatively tight frictional fit with an opening in the cap 106, so that the drinking tube 104 normally stays coupled to the cap. However, when it is desirable, or necessary, to replace the drinking tube, the drinking tube can be slid through the opening, removed from the cap, and replaced with another drinking tube of similar dimension.

Figure 2:
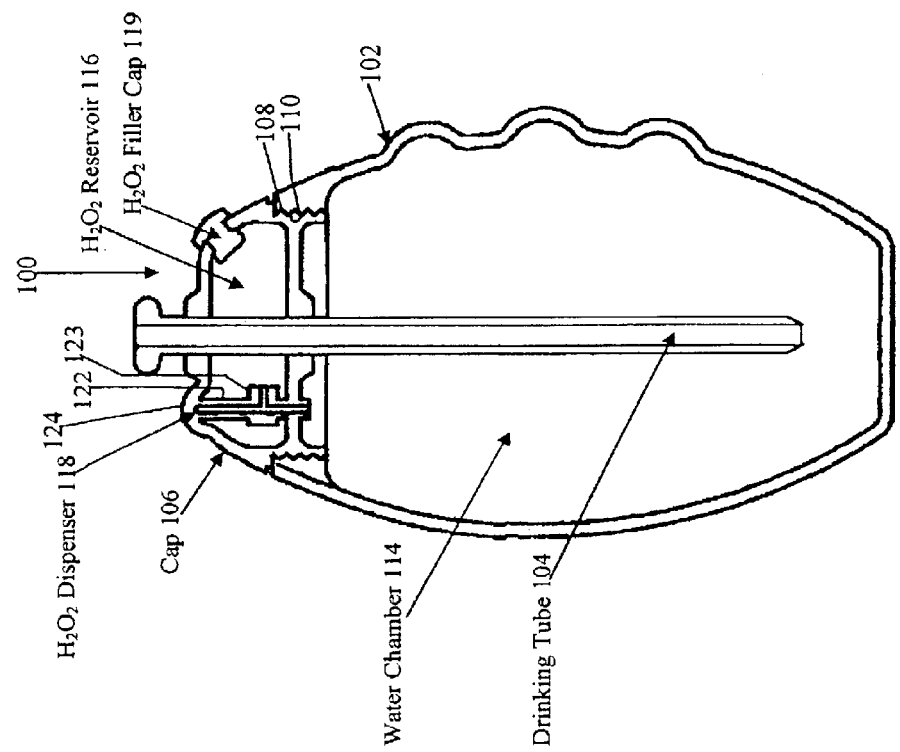
FIG. 2 a cross sectional view of one embodiment of a portable drinking device according to the present invention.

The container 102 has a water chamber 114 for receiving water or other liquid, and, in accordance with the present invention, the water chamber is also designed selectively to receive a metered amount of stabilized hydrogen peroxide to clean water or other liquid in the chamber 114. In the embodiment of FIG. 2, a reservoir 116 is provided in the cap 106 at the top of the container. The reservoir 116 provides a source of stabilized hydrogen peroxide, and an integrally formed dispenser 118 provides a device for dispensing a metered amount of stabilized hydrogen peroxide from the reservoir into the water chamber 114. A filler cap 119, located in the cap 106, can be selectively removed from a fill opening in the cap 106, to enable stabilized hydrogen peroxide to be added as needed to the reservoir 116.

In the embodiment of FIG. 3, a separate hydrogen peroxide dispenser 120 is provided, and is configured to dispense a metered amount of stabilized hydrogen peroxide into the water chamber 114. Although not illustrated, the embodiment of FIG. 3 preferably includes a cap similar to cap 106 (but without the reservoir or dispenser). When the cap is removed to enable the water chamber 114 to be filled, the dispenser 120 can add a metered amount of stabilized hydrogen peroxide to the water before the cap is coupled to the container. Alternatively, the cap can have a fill opening that is selectively opened by removal of a filler cap similar to 119 in FIG. 2, to enable the dispenser 120 to add a metered about of stabilized hydrogen peroxide to water or other liquid in the chamber 114 through the fill opening.

In the illustrated embodiments, the water chamber 114 has a known volume and the dispenser 118 (or 120) is configured to be selectively actuated to dispense stabilized hydrogen peroxide into the water chamber in single drop increments, each drop having a volume and concentration of stabilized hydrogen peroxide designed to clean a body of water having a known volume in relation to the stabilized hydrogen peroxide. Thus, when raw water is in the water chamber 114, stabilized hydrogen peroxide is added to the raw water in the water chamber in a sufficient number of drops to clean the raw water.

In the embodiment of FIG. 2, the dispenser 118 includes a vertical tube 122 that extends through the reservoir 116 and into the water chamber 114. The vertical tube has a branch conduit 123 that extends into the reservoir 116, and a plunger 124 that extends into the cap 106. Thus, the vertical tube is in fluid communication with the reservoir 116 and the chamber 114. When the plunger 124 is depressed, suction is created in the vertical tube 122, and a drop of stabilized hydrogen peroxide is drawn into the vertical tube from the reservoir 116. When the plunger 124 is released, air is forced into the vertical tube 122 by suction and will push the hydrogen peroxide down the vertical tube and dispense a drop of the stabilized hydrogen peroxide into the water chamber 114.

The embodiment of FIG. 3 works on similar principles, but in this embodiment, rather than forming the cap with an integral reservoir and dispenser, the separate dispenser 120 is provided, and dispenses single drops of stabilized hydrogen peroxide directly into the water chamber 114. The dispenser includes a reservoir 126 containing stabilized hydrogen peroxide, and includes a flexible activator 128 that is squeezed to dispense a drop of stabilized hydrogen peroxide into the water chamber 114. The dispenser 120 works in much the same way as an eyedropper works, to dispense a drop of stabilized hydrogen peroxide into the water chamber.

With either of the foregoing embodiments, a person can put raw water from a source into the water container, dispense a metered amount of stabilized hydrogen peroxide into the water container, and thereby quickly and efficiently clean the raw water to a state where it is suitable for human consumption. The stabilized hydrogen peroxide in metered amounts in relation to the container of raw liquid, will oxidize chlorine and dangerous organisms such as cryposperidia and/or giardia, and otherwise clean the water or other liquid to a state in which it is fit for human consumption. This provides persons who are mobile, and who must look to their environment for sources of sustenance, with a quick and efficient way to provide themselves with clean drinking water or other liquids.

In addition, while the principles of the invention have been described above in connection with a portable drinking container, they can also be applied to different bodies of raw water or other liquids. Essentially, according to the principles of the present invention, a metered amount of stabilized hydrogen peroxide would be added to a body of raw water or other liquid, to purify the liquid. The stabilized hydrogen peroxide would be added to the body of raw water or other liquid in increments having a known concentration in relation to the volume of the body of water or other liquid, so that the stabilized hydrogen peroxide will function to clean the raw water or other liquid.

The container is preferably molded of FDA approved synthetic resin, such as low-density polymethamine, with a wall thickness that will not cause leaching by the liquid it contains. The synthetic resin will also preferably use an FDA white or other approved colorant. The drinking tube and the cap are preferable molded of the same synthetic material.

Accordingly, the foregoing description provides a device for cleaning raw water or other liquid, and provides a particularly useful device for a portable container in which raw water or other liquid can be quickly and conveniently cleaned. With the foregoing disclosure in mind, various ways to clean raw water or other liquid in accordance with the principles of the present invention will become apparent to those in the art.

What is claimed is:

1. A portable drinking device, comprising:
   a portable container having a liquid chamber and an open end;
   a cap attached to said open end;
   a delivery device with an intake located in the liquid chamber and an outlet extending through said cap out of the portable container, so that liquid from the liquid chamber can be drawn from the container through the delivery device;
   a dispenser formed integrally with said cap and adapted to be carried with said portable container, the dispenser including:
      a reservoir of stabilized hydrogen peroxide at least partially located within the liquid chamber of the container;
      a tube; and
      a manually depressible plunger formed in a top surface of said cap, wherein the dispenser is configured to selectively dispense a metered amount of stabilized hydrogen peroxide from the reservoir into the liquid chamber of the portable container via said tube, when said plunger is depressed by a user.

2. A portable drinking device as defined in claim 1, wherein said plunger is configured to dispense a single drop of stabilized hydrogen peroxide into the liquid chamber.

3. A portable drinking device as defined in claim 1, wherein the dispenser is configured to be selectively actuated to dispense stabilized hydrogen peroxide into the liquid chamber in single drop increments.

* * * * *